(12) United States Patent
Haller

(10) Patent No.: US 11,117,497 B2
(45) Date of Patent: Sep. 14, 2021

(54) VEHICLE SEAT HAVING A DISPLACEABLE UPPER BACKREST PART

(71) Applicant: GRAMMER AG, Amberg (DE)

(72) Inventor: Thomas Haller, Amberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/854,046

(22) Filed: Apr. 21, 2020

(65) Prior Publication Data

US 2020/0339015 A1    Oct. 29, 2020

(30) Foreign Application Priority Data

Apr. 25, 2019 (DE) .......................... 102019110765.2

(51) Int. Cl.
*B60N 2/22* (2006.01)

(52) U.S. Cl.
CPC ......... *B60N 2/2222* (2013.01); *B60N 2/2227* (2013.01); *B60N 2/2236* (2013.01); *B60N 2002/2204* (2013.01)

(58) Field of Classification Search
CPC .......... B60N 2002/0288; B60N 2/2222; B60N 2/868
USPC ................................ 297/230.14, 383, 452.4
See application file for complete search history.

(56) References Cited

U.S. PATENT DOCUMENTS

| | | | |
|---|---|---|---|
| 937,343 A | 10/1909 | Wallace | |
| 1,257,427 A | 2/1918 | Underwood | |
| 3,300,249 A | 1/1967 | Schneider | |
| 3,342,528 A * | 9/1967 | Radke | A47C 7/48 297/383 |
| 3,393,938 A | 7/1968 | Meyer et al. | |
| 4,108,493 A | 8/1978 | Naus | |
| 4,634,176 A | 1/1987 | Scott | |
| 4,793,652 A * | 12/1988 | Hannah | A61G 5/10 297/230.14 |

(Continued)

FOREIGN PATENT DOCUMENTS

| | | |
|---|---|---|
| DE | 10307481 | 9/2004 |
| DE | 102005008159 | 6/2006 |

(Continued)

OTHER PUBLICATIONS

Official Action for German Patent Application No. 102019110765.2, dated Jan. 31, 2020, 2 pages.

(Continued)

*Primary Examiner* — Sarah B McPartlin
(74) *Attorney, Agent, or Firm* — Sheridan Ross P.C.

(57) ABSTRACT

The invention relates to a vehicle seat having a seat part and a backrest part, which comprises a lower backrest part and an upper backrest part arranged adjacent thereto in the vertical direction of the vehicle seat, a displacement device being arranged with a first section, which is fixedly connected to the lower backrest part, and with a second section, which is fixedly connected to the upper backrest part, the second section being completely displaceable together with the upper backrest part relative to the lower backrest part by means of a displacement movement directed at least in part in the width direction of the vehicle seat, the first section being arranged completely below the upper backrest part in the vertical direction and forming a guideway for the displacement movement of the second section.

20 Claims, 4 Drawing Sheets

(56) References Cited

U.S. PATENT DOCUMENTS

| | | | |
|---|---|---|---|
| 5,108,150 | A | 4/1992 | Stas et al. |
| 5,154,477 | A | 10/1992 | Lacy |
| 5,211,696 | A | 5/1993 | Lacy |
| 5,772,280 | A | 6/1998 | Massara |
| 6,305,749 | B1 | 10/2001 | O'Connor et al. |
| 6,648,416 | B2 | 11/2003 | O'Connor |
| 6,893,095 | B2 | 5/2005 | Schambre et al. |
| 7,178,874 | B2 | 2/2007 | Demski |
| 7,264,313 | B2 | 9/2007 | Clough |
| 9,221,362 | B2 * | 12/2015 | Schneider ............. B60N 2/868 |
| 9,283,871 | B2 * | 3/2016 | Uebelacker ............. B60N 2/38 |
| 9,610,864 | B2 | 4/2017 | Uebelacker et al. |
| 9,682,781 | B2 | 6/2017 | Brandt et al. |
| 2003/0151279 | A1 | 8/2003 | Fowler |
| 2003/0155797 | A1 | 8/2003 | Amirault et al. |
| 2003/0178880 | A1 | 9/2003 | Hannah |
| 2013/0134753 | A1 * | 5/2013 | Buehlmeyer ......... B60N 2/809 297/284.1 |
| 2013/0175837 | A1 | 7/2013 | Buehlmeyer et al. |
| 2015/0015045 | A1 | 1/2015 | Uebelacker et al. |
| 2020/0189435 | A1 | 6/2020 | Ruidisch |

FOREIGN PATENT DOCUMENTS

| | | |
|---|---|---|
| DE | 102005009126 | 9/2006 |
| DE | 102006052207 | 5/2008 |
| DE | 112011100763 | 1/2013 |
| DE | 102011055895 | 6/2013 |
| DE | 102011055897 | 6/2013 |
| DE | 102012104184 | 11/2013 |
| DE | 102013110445 | 12/2014 |
| EP | 2818357 | 12/2014 |
| EP | 2818358 | 12/2014 |
| EP | 2818359 | 12/2014 |
| FR | 2927855 | 8/2009 |
| FR | 2929185 | 10/2009 |
| FR | 2932429 | 12/2009 |
| FR | 3061457 | 7/2018 |
| KR | 100316939 | 11/2001 |
| KR | 100526790 | 11/2005 |

OTHER PUBLICATIONS

Extended Search Report for European Patent Application No. 20168881.9, dated Oct. 20, 2020, 7 pages.

* cited by examiner

VEHICLE SEAT HAVING A DISPLACEABLE UPPER BACKREST PART

CROSS-REFERENCE TO RELATED APPLICATIONS

This application claims the benefit of German Patent Application No. 10 2019 110 765.2 filed Apr. 25, 2019, the entire disclosure of which is incorporated herein by reference in its entirety.

FIELD

The invention relates to a vehicle seat having a seat part and a backrest part, which comprises a lower backrest part and an upper backrest part arranged adjacent thereto in the vertical direction of the vehicle seat, a displacement device being arranged with a first section, which is fixedly connected to the lower backrest part, and with a second section, which is fixedly connected to the upper backrest part.

BACKGROUND

Generic vehicle seats, in particular for commercial vehicles and specifically for agricultural vehicles, are already known from the prior art.

In particular drivers of agricultural vehicles, during their work with these agricultural vehicles and the working implements attached thereto, often take up a further, laterally or rearwardly orientated sitting posture, which differs from the normal, forward-orientated sitting posture, in other words in the direction of travel, over a relatively long period, for example so as to be better able to reach and operate control elements located to the side at the rear of the vehicle cab, or so as to be better able to observe a working implement which is hitched behind the agricultural vehicle for a relatively long period.

In order to make it easier for the driver to gain access or a rearward view in this laterally or rearwardly orientated sitting posture, it is known from the prior art to be able to laterally displace an upper backrest part relative to a lower backrest part. However, solutions are known from the prior art in which a remainder of the upper backrest part always stays within the driver's field of vision. This is perceived as distracting.

SUMMARY

The object of the present invention is to develop a backrest part which has an upper backrest part which is securely guided and can be displaced completely out of the driver's field of vision.

The object of the invention is achieved by a vehicle seat having a seat part and a backrest part, which comprises a lower backrest part and an upper backrest part arranged adjacent thereto in the vertical direction of the vehicle seat, a displacement device being arranged with a first section, which is fixedly connected to the lower backrest part, and with a second section, which is fixedly connected to the upper backrest part, the second section together with the upper backrest part being fully displaceable with respect to the lower backrest part by means of a displacement movement directed at least in part in the width direction of the vehicle seat, the first section being arranged completely below the upper backrest part in the vertical direction and forming a guideway for the displacement movement of the second section.

For example, the lower backrest part together with the upper backrest part is centred in the width direction of the vehicle seat when the upper backrest part is in a non-displaced home position. Furthermore, the lower backrest part is still centred in the width direction of the vehicle seat, for example, even if the upper backrest part is in a displaced position.

For example, the home position and the displaced position are the only two positions that the upper backrest part can occupy in a mechanically secured way, for example, mechanically secured by frictional engagement. Alternatively, it can be provided that the upper backrest part can occupy a plurality of mechanically secured displacement positions between the home position and the displaced position.

The displacement movement can preferably be initiated by overcoming a frictional engagement between the first and the second section that forms the mechanical securing of the respective position. This preferably applies to a displacement movement starting from the home position and also for a displacement movement back to the home position.

This can be achieved, for example, by exerting a force on the upper backrest part that is applied, for example, by a seat occupant and is large enough to overcome the frictional engagement.

Alternatively, it is possible for the vehicle seat to have a device which is suitable for measuring and/or detecting a pressure; for example, this device is a pressure sensor which is arranged in the backrest and, when measuring a pressure exerted by the seat occupant which exceeds a specific limit value, forwards a corresponding signal to a control device. If the vehicle seat has actuators, for example in the form of a motor or electromagnets, they can preferably be controlled via the control device and, for example, are able to move the upper backrest part in the direction of the displacement movement.

For example, the upper backrest part and/or the lower backrest part each comprises only one frame portion or only one upholstery portion or one frame portion together with one upholstery portion.

The upper backrest part is preferably configured in one piece if it comprises only the frame portion or only the upholstery portion. If the upper backrest part comprises the frame portion together with the upholstery portion, the frame portion is preferably configured in one piece and the upholstery portion in one piece. The frame portion of the upper backrest part is preferably made from a deep-drawn sheet metal part or from a plastics injection-moulded part.

Furthermore, the upper backrest part is preferably the only element (apart from the second part of the aforementioned displacement device) which can be displaced by means of the aforementioned displacement device. The upper backrest part is preferably configured without a direct connection to the seat part. The upper backrest part is preferably connected to the lower backrest part only by means of the aforementioned displacement device, that is to say indirectly. The upper backrest part therefore preferably has no direct connection to the lower backrest part. In particular, the frame portion of the upper backrest part is free of a direct connection to the frame portion of the lower backrest part. On the other hand, it can be advantageous if the upholstery portion of the upper backrest part is arranged at least in contact with the upholstery portion of the lower backrest part.

The lower backrest part therefore cannot be moved relative to the remainder of the vehicle seat, in particular with respect to the seat part, by means of the aforementioned displacement device. This applies particularly preferably to the frame portion and to the upholstery portion of the lower backrest part. This allows the lower backrest part to be stable and possibly also more comfortable or heavier, since its mass does not have to be moved. Nevertheless, the lower backrest part can be pivotally mounted, for example, relative to the seat part by means of a further displacement device in order, for example, to be able to change the degree of inclination of the lower backrest part relative to the seat part.

The present invention thus ensures that no elements of the vehicle seat remain in the relevant field of vision after a displacement movement of the upper backrest part has taken place. At least a part of the region which is taken up by the upper backrest part when the upper backrest part is not displaced is therefore free from the upper backrest part and/or also free from other parts of the vehicle seat when the upper backrest part is displaced.

The displacement movement preferably represents a purely translational movement or a combined movement having translational and rotary components. The displacement movement is preferably not exclusively a rotary movement, at least not about an axis close to the body, which therefore runs through the second portion. On the other hand, a purely rotary displacement movement about an axis remote from the body, that is, about an axis that does not intersect the second part, is possible.

The upper backrest part preferably has only the degree or degrees of freedom relative to the lower backrest part which relate to a displacement by means of the aforementioned displacement device. In particular, it is preferred that the upper backrest part is not pivotally mounted relative to the lower backrest part, or at least is not pivotally mounted about an axis that is not arranged parallel to the vertical direction of the vehicle seat. These structural designs ensure simplified mechanics and thereby keep costs down.

It is particularly advantageous that the first section of the displacement device is located completely below the upper backrest part. It is therefore in particular arranged so as not to protrude above an upper limit of the lower backrest part in the vertical direction of the vehicle seat. The first section is particularly preferably arranged completely below the upper limit. Thus, the first section can also advantageously be arranged mounted in the stable lower backrest part. In particular, the first section itself can be configured as part of a frame portion of the lower backrest part; this part is particularly preferably able to increase the stability of the frame portion of the lower backrest part, for example by being arranged as a connecting element between other parts of the frame portion.

It is preferred that the guideway be formed by means of at least one guide element extending in the width direction of the vehicle seat. For example, this guide element has a tubular design, for example a pipe. The guide element preferably configures the guideway for the second section by virtue of its outer shape (outer diameter) and its course, especially in the direction of displacement. The shape of the guideway can preferably be described as identical to the central axis of the guide element.

While the arrangement of a single guide element appears sufficient in some vehicle seats, it may be advantageous to fully define the degrees of freedom of the displacement device, for example by also preventing an unwanted tilting of the second section about the guide elements when the vehicle seat is in the idle state. A particularly preferred variant accordingly provides that the guideway is formed by means of two guide elements which are arranged at a distance from one another in the vertical direction of the vehicle seat. The second section can advantageously be arranged connected to both guide elements and guided by means thereof. In this case, the guideway can, for example, be defined such that it follows a course of a line which is centred between the central axis of the first guide element and the central axis of the second guide element.

On the one hand, the guideway can be arranged to run only in the width direction. However, it can also be the case that, for example, the guide elements are curved, so that the guideway is arranged, for example, to run in the width direction and in the vertical direction and/or in the longitudinal direction of the vehicle seat.

The guideway therefore preferably forms a curve shape, wherein the curve shape can be configured one-dimensionally, two-dimensionally or three-dimensionally. It is thus ensured by means of such a range of variants of the guideway that the upper backrest part can also be displaced in a variety of ways. For example, by selecting a suitable guideway, the upper backrest part can be displaced in the direction of the seat width, that is, towards the side, and at the same time in the vertical direction of the seat, for example downwards.

It is advantageous according to a preferred embodiment if the second section has a support portion that is rigidly connected to the upper backrest part and is connected to a sliding portion of the second section, the sliding portion being connected to the first section and being mounted so as to be movable relative thereto.

It is also advantageous if the sliding portion is mounted relative to the at least one guide element of the first section by means of sliding guide elements and/or roller guide elements. For example, the sliding portion can comprise slide bearing elements as sliding guide elements that are made of polyoxymethylene (POM), for example. It is also possible for the sliding portion to comprise ball screws as roller guide elements, which preferably allow a particularly low-friction displacement.

If only one guide element is arranged, it is preferred that the sliding portion be mounted relative to the one guide element by means of at least two sliding guide elements and/or by means of at least two roller guide elements.

If two or more guide elements are arranged, it is preferred that the sliding portion be mounted relative to the two or more guide elements as a whole by means of at least two sliding guide elements and/or by means of at least two roller guide elements. For example, the sliding portion is mounted relative to a first guide element by means of a single sliding guide element or by means of a single roller guide element. For example, the sliding portion is mounted relative to a second guide element by means of a single sliding guide element or by means of two sliding guide elements or by means of a single roller guide element or by means of two roller guide elements.

It is preferred that a lower region of the support portion be arranged adjacent to the sliding portion in the longitudinal direction of the seat. The support portion can thus be rigidly connected to the sliding portion, for example. For example, the support portion is connected to the sliding portion by means of a screw connection.

The support portion is particularly preferably arranged to extend in the vertical direction of the vehicle seat. In addition, the support portion preferably extends in the vertical direction of the vehicle seat upwards beyond the upper limit of the lower backrest part and at the same time downwards beyond a lower limit of the upper backrest part. The support portion is thus arranged in the longitudinal direction of the vehicle seat, at least in sections, adjacent to the upper backrest part and to the lower backrest part.

It is particularly preferred if the support portion is guidable in a recess arranged on an upper element of a frame portion of the lower backrest part during the displacement movement of the upper backrest part. For example, this recess is configured parallel to the course of the guideway. When the support portion is installed, it can advantageously be passed through the recess at least with its lower end and/or its lower region if the total thickness of the lower end is smaller than the width of the recess.

The support portion is particularly preferably configured in the form of a sheet metal panel which has one or more folded edges. A sheet metal panel can advantageously be cut to size by means of a laser in such a way that unnecessary parts can easily be omitted, as a result of which the mass can be kept small. At the same time, the planar surface of non-bevelled regions offers an ideal installation location for the sliding portion.

The frame portion of the lower backrest part preferably has a recess in the longitudinal direction of the vehicle seat adjacent to the position of the sliding portion and/or the support portion, so that the location for the installation of the assembly comprising the sliding portion and the support portion on the guide elements is freely accessible.

It is also possible that the displacement movement of the upper backrest part can only be initiated in a single direction, for example only to the right, starting from a non-displaced home position of the upper backrest part. Alternatively, the displacement movement of the upper backrest part can be initiated in two directions, for example to the right and to the left, starting from the non-displaced home position of the upper backrest part.

It is also advantageous if a frame portion of the lower backrest part has at least one side part which forms a stop element for the displacement movement of the upper backrest part. The displacement movement can thus be configured within predefined limits.

It is also advantageous if the frame portion of the lower backrest part has at least one side part, by means of which the at least one guide element is mounted. The at least one guide element is preferably connected to the at least one side part by means of a fixed clamping.

The frame portion of the lower backrest part particularly preferably has two side parts which are arranged opposite one another in the width direction of the vehicle seat. The at least one guide element is particularly preferably connected to said two side parts by means of a fixed clamping.

By virtue of the present invention, the upper backrest part can advantageously be made relatively narrow, since the elements which move and are connected to the upper backrest part during the displacement have a low mass overall, and therefore the upper backrest part does not have to function as a stable base for the elements. In addition, the moving elements have a centre of gravity, which is advantageously relatively far down in the vertical direction of the vehicle seat, in contrast to a conventional vehicle seat, in which the first part is arranged above the lower backrest part. This makes the seat stable.

Overall, it is advantageous if a ratio between a total width of the lower backrest part and a total width of the upper backrest part has a value in a range of from 1.2 to 3, preferably from 1.5 to 2. The upper backrest part is therefore preferably narrow in relation to the lower backrest part and can therefore be displaced quickly and easily.

BRIEF DESCRIPTION OF THE DRAWINGS

Further advantages, aims and properties of the present invention are described by way of the appended drawings and the following description, in which a vehicle seat is illustrated and described by way of example using differently configured guide devices.

In the drawings:

FIG. 3b is a detail of FIG. 3a;

DETAILED DESCRIPTION

Figure 1A:
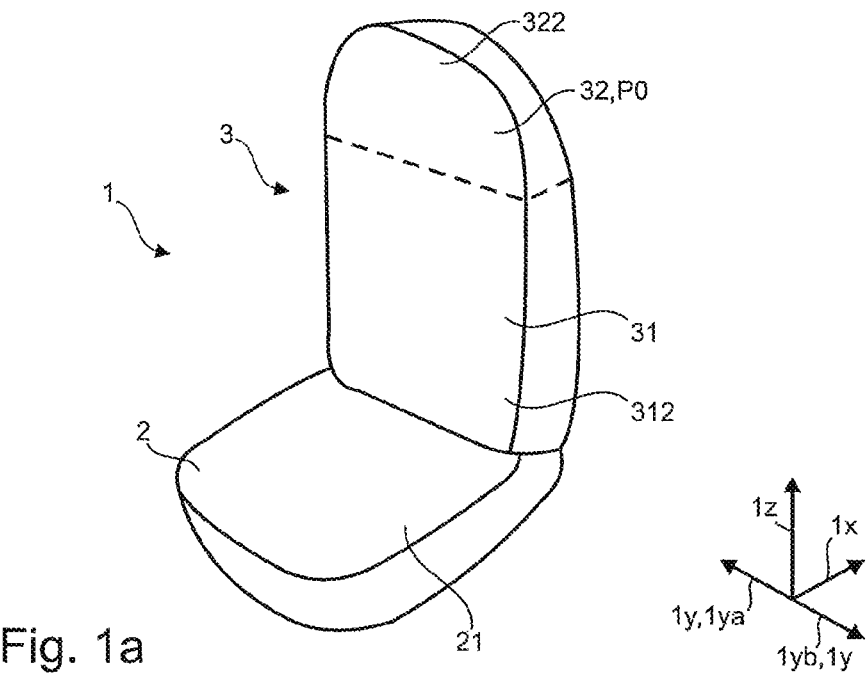
FIG. 1a is a first perspective view of a vehicle seat with an upper backrest part in a home position.
Figure 1B:
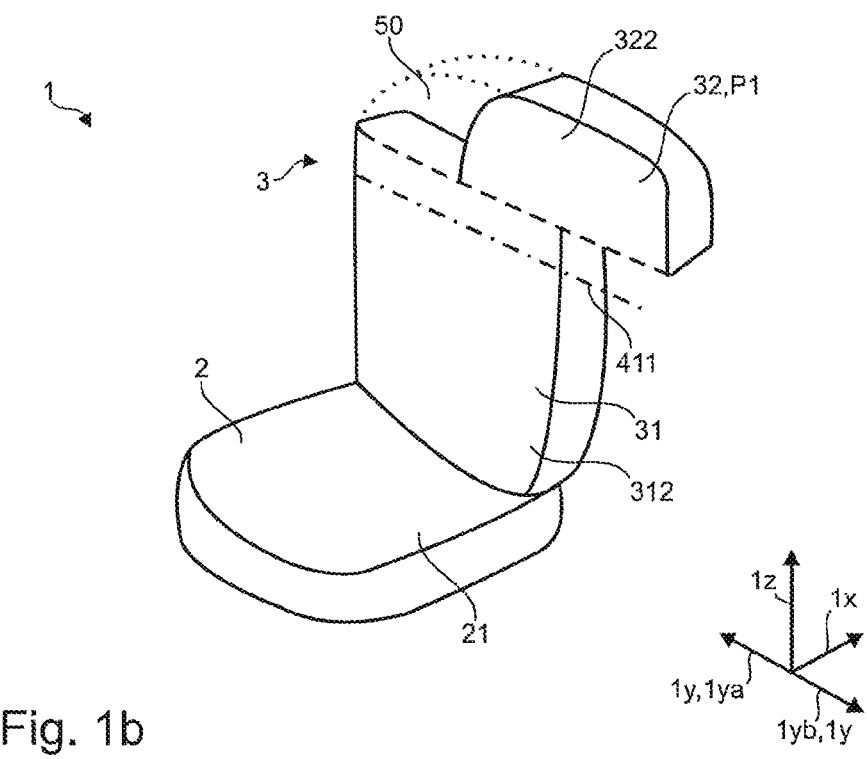
FIG. 1b is a second perspective view of the vehicle seat according to FIG. 1a with the upper backrest part in a displaced position.
Figure 2:
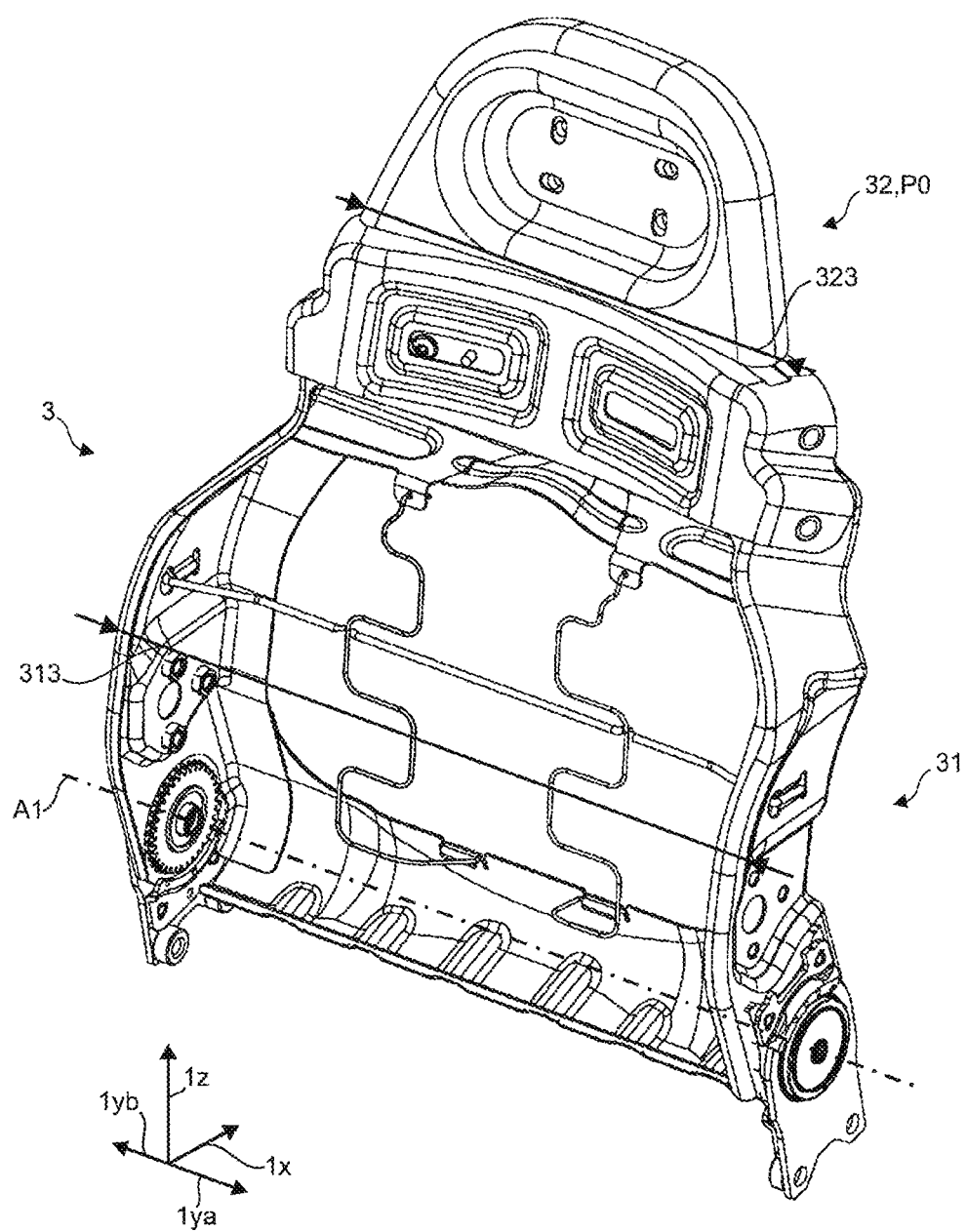
FIG. 2 is a third perspective view of the backrest part.
Figure 3A:
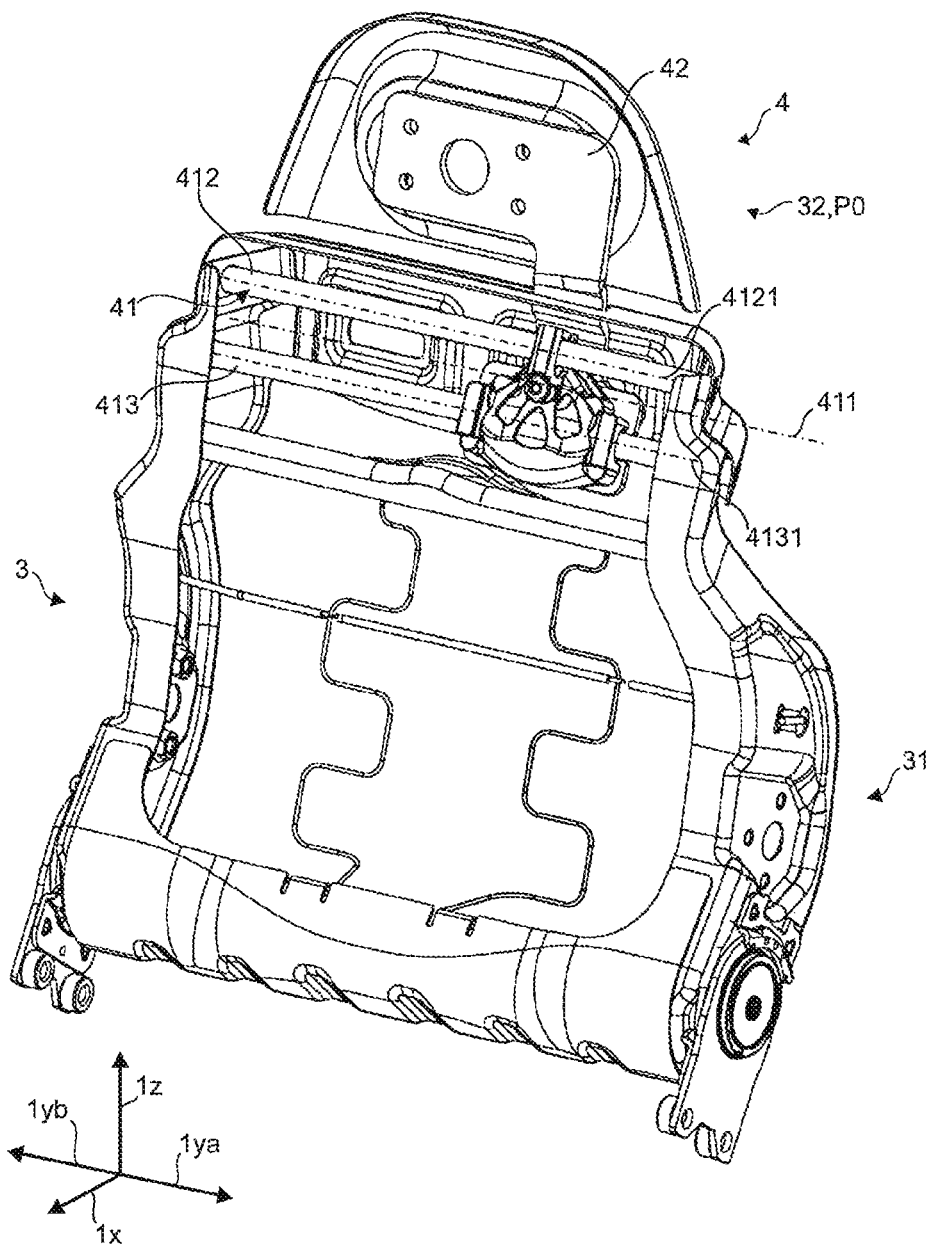
FIG. 3a is a fourth perspective view of the backrest part.
Figure 3B:
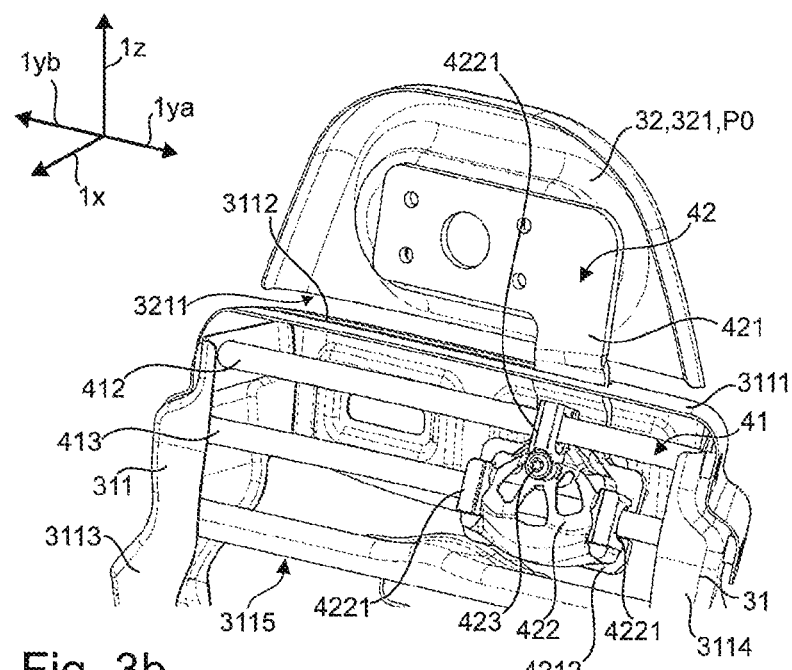
Figure 4:
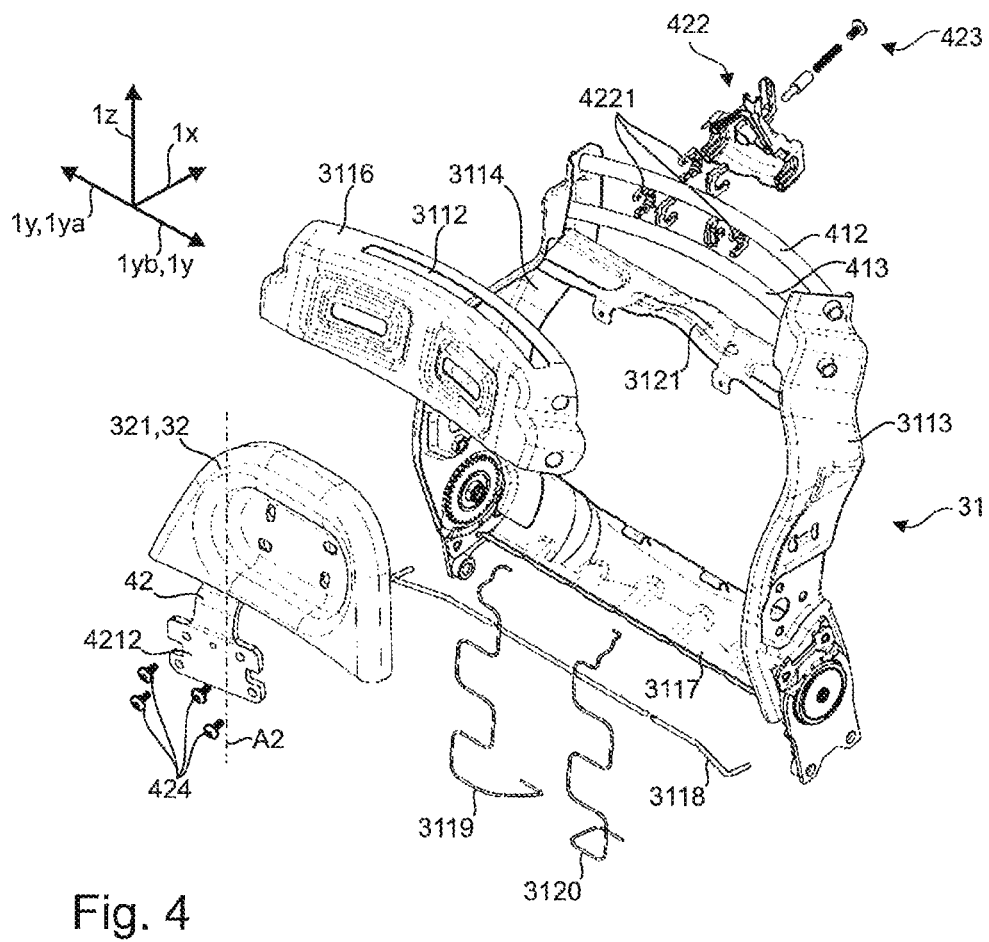
FIG. 4 is an exploded view of the backrest part.

It should be mentioned that only frame portions 311, 321 of the backrest part 3 can be seen in FIGS. 2 to 4, while in FIGS. 1a and 1b only upholstery portions 312, 322 of the backrest part 3 and an upholstery portion 21 of the seat part 2 can be seen.

According to FIGS. 1a and 1b, a vehicle seat (1) is shown having a seat part (2) and having a backrest part (3), which comprises a lower backrest part (31) and an upper backrest part (32) arranged adjacent thereto in the vertical direction (1z) of the vehicle seat (1). Also shown are the longitudinal direction 1x and the width direction 1y of the vehicle seat 1, a distinction being made in the case of the latter between a width direction to the right 1ya and a width direction to the left 1yb (each from the perspective of a seat occupant).

While the upper backrest part (32) is in a home position P0, that is to say in a non-displaced position, according to FIG. 1a the upper backrest part (32) can be seen in a displaced position P1 according to FIG. 1b. In the present case, this displaced position P1 is achieved by means of a pure translational movement of the upper backrest part (32) relative to the lower backrest part (31) to the left 1yb along the guideway 411'.

It can be seen that according to FIG. 1a the lower backrest part 31 together with the upper backrest part 32 is centred in the width direction 1y, 1ya, 1yb of the vehicle seat 1 if the upper backrest part 32 is located in the home position P0. Moreover, according to FIG. 1b, the lower backrest part 32 in the width direction 1y, 1ya, 1yb of the vehicle seat 1 is still centred, even if the upper backrest part 32 is in the displaced position P1.

According to FIGS. 2 to 4, the backrest part (3), which comprises the lower backrest part (31) and the upper backrest part (32) arranged adjacent thereto for this purpose in the vertical direction (1z) of the vehicle seat (1), is shown again in different views.

In particular, FIGS. 3a, 3b and 4 show a displacement device (4) is arranged with a first section (41), which is fixedly connected to the lower backrest part (31), and with a second section (42), which is fixedly connected to the upper backrest part (32). The second section (42) can be completely displaced with respect to the lower backrest part (31) together with the upper backrest part (32) by means of a displacement movement that in the present case is directed exclusively in the width direction (1y) of the vehicle seat (1).

It can be clearly seen that the first section (41) is arranged in the vertical direction (1z) completely below the upper backrest part (32) and forms a guideway (411) for the displacement movement of the second section (42).

In the present case, a frame portion 321 of the upper backrest part 31 is configured in one piece.

Furthermore, the upper backrest part 32 in the present case is the only element apart from the second part 42, which can be displaced by means of the aforementioned displacement device 4. In the present case, the upper backrest part 32 is configured without a direct connection to the seat part 2 (see FIGS. 1a and 1b). In the present case, the upper backrest part 32 is connected to the lower backrest part 31 only by means of the aforementioned displacement device 4, that is to say indirectly.

The upper backrest part 32 thus has no direct connection to the lower backrest part 31 in the present case. In the present case, the frame portion 321 of the upper backrest part 32 is free of a direct connection to the frame portion 311 of the lower backrest part 31.

According to FIGS. 1a and 1 b, the upholstery portion 322 of the upper backrest part 32 is arranged in contact with the upholstery portion 312 of the lower backrest part 31. Furthermore, the upholstery portion 312 of the lower backrest part 31 is arranged in contact with the upholstery portion 21 of the seat part 2.

The lower backrest part 31 cannot be displaced with respect to the remainder of the vehicle seat 1, in particular with respect to the seat part 2, by means of the aforementioned displacement device 4. This applies to the frame portion 311 and to the upholstery portion 312 of the lower backrest part 31. The lower backrest part 31 can thus be configured to be stable and in some cases also more comfortable or else heavier, since its mass does not have to be moved. Nevertheless, the lower backrest part 31 is pivotally mounted relative to the seat part 2 by means of a further displacement device (illustrated here only schematically with reference to the axis A1 according to FIG. 2) in order to be able to change the degree of inclination of the lower backrest part 31 relative to the seat part 2.

It is thus ensured that after a displacement movement of the upper backrest part 32 no elements of the vehicle seat 1 remain within the relevant field of vision. At least a part of the region 50 (see region 50 bordered here by dotted lines according to FIG. 1b) which is taken up by the upper backrest part 32 in the non-displaced state P0 of the upper backrest part 32 is thus free of the upper backrest part 32 in the displaced state P1 of the upper backrest part 32 and also free of other parts of the vehicle seat 1.

While a vehicle seat is shown in accordance with FIGS. 1a and 1b, its displacement movement is configured to be purely translational (see guideway 411'); FIG. 4 in particular shows that the first part 41 and in particular the guide elements 412, 413 run in the seat width direction and are configured as curved when seen in the longitudinal direction of the seat. The second part 42 thus experiences a purely rotational movement about an axis A2 at a distance from the body (illustrated in FIG. 4) which does not intersect the second part 42.

In the present case, the upper backrest part 32 just has the one degree of freedom compared to the lower backrest part 31 that relates to a displacement by means of the aforementioned displacement device 4. In the present case, the upper backrest part 32 is not pivotally mounted relative to the lower backrest part 31.

It can be clearly seen that the first section 41 (see guide elements 412, 413) of the displacement device 4 is located completely below the upper backrest part 31. It is therefore not arranged so as to protrude upwards beyond an upper limit of the lower backrest part 31 in the vertical direction 1z of the vehicle seat 1, which limit is configured here by the upper element 3111 of the lower backrest part 31. In the present case, the first section 41 is arranged completely below the upper limit. The first section 41 is also mounted in the stable lower backrest part 31 and is itself configured as part of the frame portion 311 of the lower backrest part 31. In the present case, the two guide elements 412, 413 of the first section 41 are arranged as a connecting element between two side parts 3113, 3114 of the frame portion 311.

It can also be seen that the guideway 411 (see FIG. 3a) is formed by means of the two guide elements 412, 413 extending in the width direction 1y of the vehicle seat 1. These guide elements 412, 413 are each configured as a tube and, by virtue of their outer shape (that is to say, for example, their outer diameter) and their course, especially in the direction of displacement, form the guideway 411 for the second section 42.

The two guide elements 412, 413 are arranged at a distance from one another in the vertical direction 1z of the vehicle seat 1. In the present case, the second section 42 is also connected to both guide elements 412, 413 and is guided by means of them. In this case, the guideway 411 is defined in such a way that it follows a course of a line which is centred between the central axis 4121 of the first guide element 412 and the central axis 4131 of the second guide element 413 (see here the illustration according to FIG. 3a).

In the present case, the guideway 411 according to FIG. 3a is arranged to run in the width direction 1y and in the longitudinal direction 1x of the vehicle seat 1. The guideway 411 thus forms a curve shape which is configured in two dimensions. In contrast, the guideway 411' according to FIG. 1b is arranged to run only in the width direction 1y of the vehicle seat 1. The guideway 411' thus forms a curve shape which is one-dimensional and thus corresponds to a straight line.

In the present case, the second section 42 has a support portion 421 rigidly connected to the upper backrest part 32, which support portion is connected to a sliding portion 422 of the second section 42, the sliding portion 422 being connected to the first section 41 and being mounted so as to be movable relative thereto.

It is also shown that the sliding portion 422 is mounted relative to the two guide elements 412, 413 of the first section 41 by means of sliding guide elements 4221, which in the present case are formed by slide bearing elements made of polyoxymethylene (POM).

In the present case, the sliding portion 422 is mounted relative to the first guide element 412 by means of a single sliding guide element 4221 and with respect to the second guide element 413 by means of two sliding guide elements 4221.

In addition, a lower region 4212 of the support portion 421 is arranged adjacent to the sliding portion 422 in the longitudinal direction of the seat 1x. The support portion 421 is rigidly connected to the sliding portion 422 in the present case. In the present case, the support portion 421 is connected to the sliding portion 422 by means of a first 423 and by means of a second screw connection 424.

In the present case, the support portion 421 is arranged to extend in the vertical direction 1z of the vehicle seat 1. In addition, the support portion 421 extends upwards in the vertical direction 1z of the vehicle seat 1 beyond the upper limit of the lower backrest part 31 (see upper element 3111) and at the same time downwards beyond a lower limit 3211 of the upper backrest part 32. The support portion 421 is thus arranged in sections in the longitudinal direction 1x of the vehicle seat 1 adjacent to the upper backrest part 32 and the lower backrest part 32.

In the present case, the support portion 421 is configured in the form of a sheet metal panel which has a plurality of folded edges. The planar surface of the non-bevelled lower region 4212 thus offers an ideal installation location for the sliding portion 422.

It is also shown that the support portion 421 can be guided in a recess 3112 arranged on an upper element 3111 of a frame portion 311 of the lower backrest part 31 during the displacement movement of the upper backrest part 32. In the present case, this recess 3112 is configured parallel to the course of the guideway 411. When the support portion 421 is installed, it can be guided through the recess 3112 at least with its lower end and/or its lower region 4212, since the total thickness of the lower region 4212 is smaller than the recess 3112.

It can also be seen that the frame portion 311 of the lower backrest part 31 in the longitudinal direction 1x of the vehicle seat 1 adjacent to the position of the sliding portion 422 and the lower region 4212 of the support portion 421 has a recess 3115 (see region between the two side parts 3113, 3114 in the width direction 1y), so that the location for the installation of the assembly comprising the sliding portion 422 and the support portion 421 on the guide elements 412, 413 is freely accessible.

In the present case, the displacement movement of the upper backrest part 32 can be initiated in two directions 1ya, 1yb, namely to the right and to the left, starting from the non-displaced home position P0 of the upper backrest part 32 shown in FIG. 3a.

In addition, the frame portion 311 of the lower backrest part 31 forms a stop element for the displacement movement of the upper backrest part 32 in each of the two directions 1ya, 1yb by means of the two side parts 3113, 3114.

In addition, both guide elements 412, 413 are mounted by means of the two side parts 3113, 3114; in the present case, both guide elements 412, 413 are connected to the two side parts 3113, 3114 by means of a fixed clamping. The two side parts 3113, 3114 are arranged opposite one another in the width direction 1y of the vehicle seat 1.

According to FIG. 4, the frame portion 311 of the lower backrest part 31 also has two cross struts 3117, 3121 in the form of deep-drawn sheet metal parts or plastics injection-moulded parts. In addition, a cover part 3116 is arranged, for example, in the form of a deep-drawn sheet metal panel or a plastics injection-moulded part which covers the guide elements 412, 413 and the adjustment mechanism of the displacement device 4 to the front and has the recess 3112. Furthermore, tension elements 3118, 3119, 3120 are arranged in the form of wire tension elements, which are arranged from top to bottom (see tension elements 3119, 3120) or from left to right (see tension element 3118) and make the seat more stable overall.

In the present case, a ratio between a total width 313 of the lower backrest part 31 and a total width 323 of the upper backrest part 32 (see FIG. 2) has a value of 1.5.

It will be appreciated that the embodiments described above are merely a first configuration of the vehicle seat according to the invention. The configuration of the invention is therefore not limited to these embodiments.

All the features disclosed in the application documents are claimed as being essential to the invention provided that, individually or in combination, they are novel over the prior art.

LIST OF REFERENCE SIGNS 1 vehicle seat
1x longitudinal direction
1y width direction
1z vertical direction
2 seat part
3 backrest part
4 displacement device
21, 312, 322 upholstery portion
31 lower backrest part
32 upper backrest part
41 first section
42 second section
311, 321 frame portion
313, 323 total width
411, 411' guideway
412, 413 guide element
421 support portion
422 sliding portion
423, 424 screw connection
3111 upper element
3112, 3115 recess
3113, 3114 side part
3116 cover part
3117, 3121 cross strut
3118, 3119, 3120 tension element
3211 lower limit
4121, 4131 central axis
4212 lower region
4221 sliding guide elements
A1, A2 axis

What is claimed is:

1. A vehicle seat, comprising:
a seat part;
a backrest part, the backrest part comprising:
  a lower backrest part;
  an upper backrest part arranged adjacent to the lower backrest part in a vertical direction of the vehicle seat; and
a displacement device having a first section fixedly connected to the lower backrest part and a second section fixedly connected to the upper backrest part,
wherein the second section and the upper backrest part are displaceable with respect to the lower backrest part by a displacement movement directed at least in part in a width direction of the vehicle seat, wherein the first section is arranged completely below the upper backrest part in the vertical direction and forms a guideway for the displacement movement of the second section, and wherein the guideway is configured by two guide elements that are arranged at a distance from one another in the vertical direction of the vehicle seat.

2. The vehicle seat according to claim 1, wherein at least one guide element of the two guide elements extends in the width direction of the vehicle seat.

3. The vehicle seat according to claim 1, wherein the displacement movement of the upper backrest part starting from a non-displaced home position of the upper backrest part can only be initiated in a single direction or in two directions.

4. The vehicle seat according to claim 1, wherein a frame portion of the lower backrest part has at least one side part that forms a stop element for the displacement movement of the upper backrest part.

5. The vehicle seat according to claim 1, wherein a frame portion of the lower backrest part has at least one side part, and wherein at least one guide element of the two guide elements is mounted on the at least one side part.

6. The vehicle seat according to claim 1, wherein a ratio between a total width of the lower backrest part and a total width of the upper backrest part has a value in a range of from 1 to 3.

7. The vehicle seat according to claim 1, wherein a ratio between a total width of the lower backrest part and a total width of the upper backrest part is equal to 2.

8. The vehicle seat according to claim 1, wherein the second section has a support portion that is rigidly connected to the upper backrest part and is connected to a sliding portion of the second section, and wherein the sliding portion is connected to the first section and is mounted to be moveable relative to the first section.

9. A vehicle seat, comprising:
a seat part;
a backrest part, the backrest part comprising:
  a lower backrest part;
  an upper backrest part arranged adjacent to the lower backrest part in a vertical direction of the vehicle seat; and
a displacement device having a first section fixedly connected to the lower backrest part and a second section fixedly connected to the upper backrest part,
wherein the second section and the upper backrest part are displaceable with respect to the lower backrest part by a displacement movement directed at least in part in a width direction of the vehicle seat, wherein the first section is arranged completely below the upper backrest part in the vertical direction and forms a guideway for the displacement movement of the second section, and wherein the guideway is arranged running in the width direction and in at least one of the vertical direction or the longitudinal direction of the vehicle seat.

10. The vehicle seat according to claim 9, wherein the displacement movement of the upper backrest part starting from a non-displaced home position of the upper backrest part can only be initiated in a single direction or in two directions.

11. The vehicle seat according to claim 9, wherein a frame portion of the lower backrest part has at least one side part that forms a stop element for the displacement movement of the upper backrest part.

12. The vehicle seat according to claim 9, wherein the guideway is formed by at least one guide element extending in the width direction of the vehicle seat.

13. The vehicle seat according to claim 9, wherein a frame portion of the lower backrest part has at least one side part, and wherein at least one guide element is mounted on the at least one side part.

14. The vehicle seat according to claim 9, wherein a ratio between a total width of the lower backrest part and a total width of the upper backrest part has a value in a range of from 1 to 3.

15. The vehicle seat according to claim 9, wherein a ratio between a total width of the lower backrest part and a total width of the upper backrest part is equal to 2.

16. The vehicle seat according to claim 9, wherein the second section has a support portion that is rigidly connected to the upper backrest part and is connected to a sliding portion of the second section, and wherein the sliding portion is connected to the first section and is mounted to be moveable relative to the first section.

17. The vehicle seat according to claim 9, wherein the guideway is formed by at least one guide element extending in the width direction of the vehicle seat.

18. A vehicle seat, comprising:
a seat part;
a backrest part, the backrest part comprising:
  a lower backrest part;
  an upper backrest part arranged adjacent to the lower backrest part in a vertical direction of the vehicle seat; and
a displacement device having a first section fixedly connected to the lower backrest part and a second section fixedly connected to the upper backrest part,
wherein the second section and the upper backrest part is displaceable with respect to the lower backrest part by a displacement movement directed at least in part in a width direction of the vehicle seat, wherein the first section is arranged completely below the upper backrest part in the vertical direction and forms a guideway for the displacement movement of the second section, wherein the second section has a support portion that is rigidly connected to the upper backrest part and is connected to a sliding portion of the second section, wherein the sliding portion is connected to the first section and is mounted to be moveable relative to the first section, and wherein the support portion is guidable in a recess arranged on an upper element of a frame portion of the lower backrest part during the displacement movement of the upper backrest part.

19. The vehicle seat according to claim 18, wherein the sliding portion is mounted relative to at least one guide element of the first section by at least one of sliding guide elements or roller guide elements.

20. The vehicle seat according to claim 18, wherein a lower region of the support portion is arranged adjacent to the sliding portion in the longitudinal direction of the vehicle seat.

* * * * *